(12) United States Patent
Pappano et al.

(10) Patent No.: US 8,173,208 B2
(45) Date of Patent: May 8, 2012

(54) METHOD FOR PRODUCING DUSTLESS GRAPHITE SPHERES FROM WASTE GRAPHITE FINES

(75) Inventors: Peter J Pappano, Oak Ridge, TN (US); Michael R Rogers, Clinton, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 454 days.

(21) Appl. No.: 11/776,085

(22) Filed: Jul. 11, 2007

(65) Prior Publication Data

US 2009/0017728 A1    Jan. 15, 2009

(51) Int. Cl.
*B05D 7/00* (2006.01)
*B05D 3/08* (2006.01)

(52) U.S. Cl. ........................................ 427/212; 427/242

(58) Field of Classification Search .................. 427/242, 427/212; 451/34
See application file for complete search history.

(56) References Cited

U.S. PATENT DOCUMENTS

| | | | |
|---|---|---|---|
| 2,984,860 A * | 5/1961 | Thomas | 425/222 |
| 3,786,134 A | 1/1974 | Amagi et al. | |
| 3,932,596 A | 1/1976 | Rohatgi | |
| 4,009,232 A | 2/1977 | Shiiki et al. | |
| 6,238,443 B1 * | 5/2001 | Lynn et al. | 23/314 |
| 2003/0065082 A1 | 4/2003 | Blanken et al. | |
| 2005/0001346 A1 | 1/2005 | Reynolds, III et al. | |

OTHER PUBLICATIONS

Kal V. S. Sastry, "Pelletization of Fine Coals", 1995, US Dept of Energy, pp. 1-1, 2-1 to 2-7, 3-1 to 3-6, and 4-1.*
A to Z of Materials, http://www.azom.com/details.asp?articleid=1630, Sep. 10, 2002.*
Indiamart website.*
Wovenwire website.*

* cited by examiner

*Primary Examiner* — James Lin
*Assistant Examiner* — Austin Murata
(74) *Attorney, Agent, or Firm* — Novak Druce + Quigg LLP

(57) ABSTRACT

A method for producing graphite spheres from graphite fines by charging a quantity of spherical media into a rotatable cylindrical overcoater, charging a quantity of graphite fines into the overcoater thereby forming a first mixture of spherical media and graphite fines, rotating the overcoater at a speed such that the first mixture climbs the wall of the overcoater before rolling back down to the bottom thereby forming a second mixture of spherical media, graphite fines, and graphite spheres, removing the second mixture from the overcoater, sieving the second mixture to separate graphite spheres, charging the first mixture back into the overcoater, charging an additional quantity of graphite fines into the overcoater, adjusting processing parameters like overcoater dimensions, graphite fines charge, overcoater rotation speed, overcoater angle of rotation, and overcoater time of rotation, before repeating the steps until graphite fines are converted to graphite spheres.

13 Claims, No Drawings

METHOD FOR PRODUCING DUSTLESS GRAPHITE SPHERES FROM WASTE GRAPHITE FINES

STATEMENT REGARDING FEDERALLY SPONSORED RESEARCH

This invention was made with United States Government support under Contract No. DE-AC05-00OR22725 between the United States Department of Energy and U.T. Battelle, LLC. The United States Government has certain rights in this invention.

FIELD OF THE INVENTION

The field of the invention relates generally to a method for converting nuisance and unhealthy graphite fines into dustless graphite spheres for safer handling and recycling.

BACKGROUND OF THE INVENTION

There is no known industrially available machine today for recycling graphite dust and fines. Some have used pharmaceutical equipment for making pills wherein the powder is pressed but then must be baked, which adds cost. Converting the dust into a pellet or sphere would be attractive, because when graphite powder is used for steel making and other graphite processing, particles become airborne causing material loss and industrial hygiene concerns.

Typical carbon plants can make about 15 million pounds of graphite a year, and generate about 1 to 1.5 million pounds of dust. There is a production cost advantage to bagging the dust and fines and selling them as waste. Some of the dust can have very high purity (e.g. >=99% pure) particles, thus suitable for being reground and screened to make particles of the size desired. The dust and fines are not reprocessed but are collected and processed as waste.

Carbon spheres having a particle diameter smaller than 1 micron can be produced by techniques utilized for the production of carbon black such as furnace black or channel black. It is much more difficult to obtain carbon spheres having a particle diameter in the range of from 1 to 20 microns. These carbon spheres generally tend to exhibit a phenomenon wherein several adjacent carbon spheres adhere to form a fused cluster. Methods for the production of carbon spheres or hollow carbon spheres resistant to mutual cohesion have been disclosed in the specification of U.S. Pat. No. 3,786,134. This method relates to the manufacture of carbon spheres having particle diameters not smaller than 30 microns and is a process using virgin materials.

Another source of graphite waste is kish, which refers generally to carbon material that collects at the surface of molten iron (hot metal) from a blast furnace after casting. At casting temperatures, the liquid iron is saturated with dissolved carbon. As the iron cools, it becomes supersaturated with carbon. The carbon comes out of the iron solution as flakes of graphite. Graphite is a soft mineral that occurs as thin plates and is composed of pure carbon. The longer the hot metal cools, the greater the yield of graphite flakes.

In BOF (basic oxygen furnace) steelmaking operations, kish is also produced during the steps of reladling, desulphurization of the hot metal, slag skimming, and ladle treatment. Kish produced during these steps is collected as baghouse dust and varies in quantity and composition. The quantity of kish materials collected as baghouse dust is significant. Disposal of the kish, recycling or other treatment, requires some handling. The kish dust is difficult to handle. The kish dust is dry and contains an ultra fine component.

The distribution of particle sizes of the kish dust shows that 30 to 40 percent of the kish has a particle size less than 25 microns. High-carbon dust with a particle size greater than 10 microns exhibits a tendency to settle to the ground in ambient air. Part of the kish, however, has a particle size smaller than 10 microns. Particle sizes between about 1 and 10 microns exhibit a resistance to settling both in ambient air and water that increases as the particle size decreases. Below a particle size of about 1 micron, a significant amount of the kish dust remains airborne and does not settle. Thus, part of the kish dust is so fine that it tends to remain airborne. This makes it easy for wind to carry the kish dust far from the source of kish, especially during handling where the dust may become agitated during handling and disposal. An area surrounding the source of kish therefore becomes susceptible to contamination, especially if attempts are made to handle or transport the kish for recycling, beneficiation, and/or disposal.

The tendency for the kish to contaminate surrounding areas is exacerbated by its physical properties. The graphite contained in the kish dust exhibits hydrophobic properties. The hydrophobic properties inhibit wetting. When attempts are made to contain the dust by applying water to the dry kish, the kish dust floats on the water. Water application therefore falls well short of alleviating the dustiness and difficulties associated with handling of the kish. It also falls well short of alleviating the problem of environmental contamination.

In view of the hydrophobic properties of the graphite, attempts have been made to apply a surface active agent (i.e., a surfactant) to the kish, in order to provide a wetting agent along with the water as taught in U.S. Pat. No. 3,932,596 to Rohatgi. While those attempts were successful to some extent at containing the kish temporarily, eventually the resulting combination of kish, water, and surfactant would dry. When it dried, the kish again became dusty, and was able to contaminate the surrounding area.

The potential for contamination, however, is not the only disadvantage of the prior techniques. The difficulty associated with handling of the kish and its tendency to become airborne during handling has a negative impact on the recovery of commercially valuable material, such as graphite, from the kish. In particular, the loss of kish dust into the air reduces the total amount of material that can be recovered from the kish.

There is consequently a need in the art for a way of agglomerating graphite such as kish, so that it can be handled and/or stored with little, if any, of the kish contaminating or becoming suspended in the surrounding air. A need also exists for a graphite product that can be transported easily for recycling, beneficiation, and/or disposal, with little or no contamination of the surrounding air, and which can be handled and/or treated to recover such materials.

BRIEF DESCRIPTION OF THE INVENTION

A method for producing graphite spheres from graphite fines comprising the steps of: a) charging a quantity of spherical media into a rotatable cylindrical overcoater, b) charging a quantity of graphite fines into the overcoater thereby forming a first mixture of the spherical media and graphite fines, c) rotating the overcoater at a speed such that the first mixture climbs the wall of the overcoater before rolling back down to the bottom thereby forming a second mixture of spherical media, graphite fines, and graphite spheres, d) removing the second mixture from the overcoater, e) sieving the second mixture to separate the graphite spheres from the second mixture, f) charging the first mixture back into the overcoater, g) charging an additional quantity of graphite fines into the overcoater having, h) adjusting at least one processing parameter selected from the group consisting of overcoater dimensions, graphite fines charge, overcoater rotation speed, overcoater angle of rotation, and overcoater time of rotation, and i) repeating steps b) through h) until graphite fines are converted to graphite spheres.

DETAILED DESCRIPTION OF THE INVENTION

This invention is derived from an overcoating technique comprised of matrix production and overcoating. The matrix is a combination of powdered natural graphite, synthetic graphite, and liquid thermosetting resin in the ratio of 64:16:20, respectively. The matrix is formed via a wet mixing process. The matrix is then allowed to dry and then re-ground into a fine powder/resin mixture. The matrix is then used to overcoat a TRISO particle, or build up a layer of this powder/resin mixture on the surface of the TRISO particle. Overcoating takes place in a rotating steel can, or overcoater. The TRISO particles and matrix are placed in the overcoater and then spun at a high enough RPM to force the particle/matrix mixture to the walls of the overcoater. A spatula is then run down along the inner wall of the overcoater in order to force the particle/matrix mixture off the side of the overcoater wall. This "spray" of particles and matrix is directed through a fine mist of methanol, which is created by an ultrasonic atomizer and syringe pump. The rotation of the overcoater and wetting action from the methanol cause the matrix to adhere to the outer surface of the TRISO particles. The thickness of this overcoat layer is determined by the amount of matrix added to the particles and the duration of rotation of the overcoater.

Experiments involving an overcoating process were attempted in the absence of methanol with the overcoater rotating at slow speeds such that the particles and matrix were not forced to the walls of the overcoater. The overcoating process involved only mixing matrix and TRISO particles and rotating them slowly in the overcoater without exposure to methanol. This dry, slow rolling method led to the formation of what appeared to be overcoated particles. Upon further inspection, however, the overcoated particles were found to be only hollow balls of matrix. In other words, there was no particle in the center of the ball of matrix. It was also found that the size of these matrix spheres could be controlled based on rotation speed, and that the spheres could be easily moved from one container to the next without the formation of airborne graphite dust.

It was discovered that this modified overcoating process can be used to transform powdered graphite fines into sizeable spheres, which would provide a health benefit and also commercial possibilities. Graphite fines are a nuisance material at the carbon and steel making facilities, mainly because they were difficult to transport and size-classify, so forming them into spheres would eliminate both these problems. Therefore the modified overcoating process was used on straight graphite powder (not matrix, which contains resin) without the presence of TRISO particles. It was discovered that simply rotating the graphite powder at various speeds, overcoater angles, and rotation times led to the formation of dustless graphite spheres.

In one experiment, the dustless graphite spheres were formed by taking a quantity of graphite powder (the graphite powder used in these experiments was 6.5 micron average particle size) and rotating it in a steel can. The overcoater used here was 6 in. in diameter by 8 in. deep and was held at a 45 degree angle of rotation. The overcoater angle of rotation can be in the range of approximately 10 to 80 degrees. For this sized can, 20 g of graphite powder was found to be the optimal charge. The 20 g of powder was rotated at ~10 RPM for six minutes. The overcoater rotation speed can be in the range of approximately 0.1 to 20 RPM. The overcoater time of rotation can be in the range of approximately 0.1 to 30 minutes. At the conclusion of the six minutes approximately 14 g of graphite spheres were present. The key properties for forming dustless graphite spheres are overcoater dimensions, graphite fines charge, rotation speed, angle of rotation, and time of rotation. Changing these properties will lead to larger or smaller spheres.

In another experiment, a 20.0 g quantity of spherical media was weighed out and charged to a cylindrical plastic overcoater that was 4 in. in diameter and 6 in. deep. The top or lid of the overcoater was attached to a lab stirrer so that the overcoater could be rotated at various speeds, and tilted at various angles. The spherical media used were zirconia particles coated with a layer of pyrolytic carbon (~780 micron in diameter). The properties of the spherical media are believed to be unimportant, but may dictate the size of graphite spheres formed during processing.

Next, a 1.0 g quantity of graphite fines were weighed out and charged to the plastic overcoater that contained the spherical media. The graphite fines charge can be in the range of approximately 0.1 to 10 grams. Two graphite fines were tested during these experiments. The graphite fines were provided by Graftech International (GTI) and SGL Carbon LLC. The mean particle size of the GTI material was 6 microns and the mean particle size of the SGL material was 12 microns.

Next, the lab stirrer motor was energized and the plastic overcoater was rotated at a speed such that the graphite fine/spherical media mixture climbed about ⅔ of the way up the wall of the overcoater before rolling back down to the bottom. Once this action was achieved, the material was allowed to roll for five minutes. During this five minute rolling period graphite spheres noticeably larger in diameter than the spherical media were observed to form. The rolling or tumbling action of the graphite and media is critical to the formation of theses graphite spheres. The action is analogous to a snowball rolling down a hill, gathering more snow, and growing in diameter. This process is repeated every time the graphite sphere climbs up the wall of the overcoater and then rolls back down through the graphite/media mixture.

At the conclusion of the five minutes of rolling, the material in the overcoater was removed and sieved in order to separate the graphite spheres from the media. The media is then put back into the jar, a new quantity of graphite is weighed out and charged to the jar, and the process is repeated. The graphite spheres recovered after sieving were viewed under a shadow scope and their diameters were found to be ~800 microns. The graphite spheres can be in the range of approximately 50 to 5000 microns.

The benefit of this process is that is produces graphite spheres that are non-friable so that they can be easily handled without the formation of hazardous dust. The current state of the art involves moving graphite powders mechanically and having EPA fineable quantities of dust being emitted. This method provides an easy process for transforming the dust into a user friendly product that is much less friable and dusty than the original graphite powder.

While there has been shown and described what are at present considered the preferred embodiments of the invention, it will be obvious to those skilled in the art that various changes and modifications can be made therein without departing from the scope.

We claim:

1. A method for producing graphite spheres, wherein the graphite spheres consist of graphite, the method, comprising the steps of collecting a waste mixture consisting essentially of waste graphite fines, placing said waste mixture into a vessel, and rotating the vessel containing the mixture consisting essentially of waste graphite fines to form graphite spheres.

2. The method according to claim 1, wherein the vessel is a rotatable cylindrical overcoater and the method further comprises adjusting at least one processing parameter selected from the group consisting of overcoater dimensions, waste graphite fines charge, overcoater rotation speed, overcoater angle of rotation, and overcoater time of rotation.

3. The method according to claim 1, wherein the graphite spheres are dustless graphite spheres.

4. A method for producing graphite spheres from graphite fines, wherein the graphite spheres consist of graphite, the method comprising the steps of:
   a) charging a quantity of spherical media into a rotatable cylindrical overcoater,
   b) charging a quantity of waste graphite fines into said rotatable cylindrical overcoater thereby forming a first mixture of said spherical media and waste graphite fines,
   c) rotating said rotatable cylindrical overcoater at a speed such that said first mixture climbs the wall of said overcoater before rolling back down to the bottom thereby forming a second mixture of spherical media, waste graphite fines, and graphite spheres,
   d) removing said second mixture from said overcoater,
   e) sieving said second mixture to separate said graphite spheres from said second mixture, thereby leaving said first mixture,
   f) charging said first mixture back into said overcoater,
   g) charging an additional quantity of waste graphite fines into said overcoater having said first mixture,
   h) adjusting at least one processing parameter selected from the group consisting of overcoater dimensions, waste graphite fines charge, overcoater rotation speed, overcoater angle of rotation, and overcoater time of rotation,
   i) repeating steps b) through h) until waste graphite fines are converted to graphite spheres.

5. The method of claim 4 wherein said spherical media further comprises zirconia and pyrolytic carbon.

6. The method of claim 4 wherein said rotatable cylindrical overcoater is made from at least one material selected from the group consisting of metal and plastic.

7. The method of claim 4 wherein the particle size of said waste graphite fines is in the range of approximately 6 to 12 microns.

8. The method of claim 4 wherein said waste graphite fines charge is in the range of approximately 0.1 to 20 grams.

9. The method of claim 4 wherein said overcoater rotation speed is in the range of approximately 0.1 to 20 RPM.

10. The method of claim 4 wherein said overcoater angle of rotation is in the range of approximately 10 to 80 degrees.

11. The method of claim 4 wherein said overcoater time of rotation is in the range of approximately 0.1 to 30 minutes.

12. The method of claim 4 wherein said graphite spheres are in the range of approximately 50 to 5000 microns.

13. The method of claim 4, wherein the graphite spheres are dustless.

* * * * *